Nov. 13, 1956  L. PETERS  2,770,547
SOFT PLASTIC FOOD PACKAGE
Filed Aug. 16, 1954  2 Sheets-Sheet 1
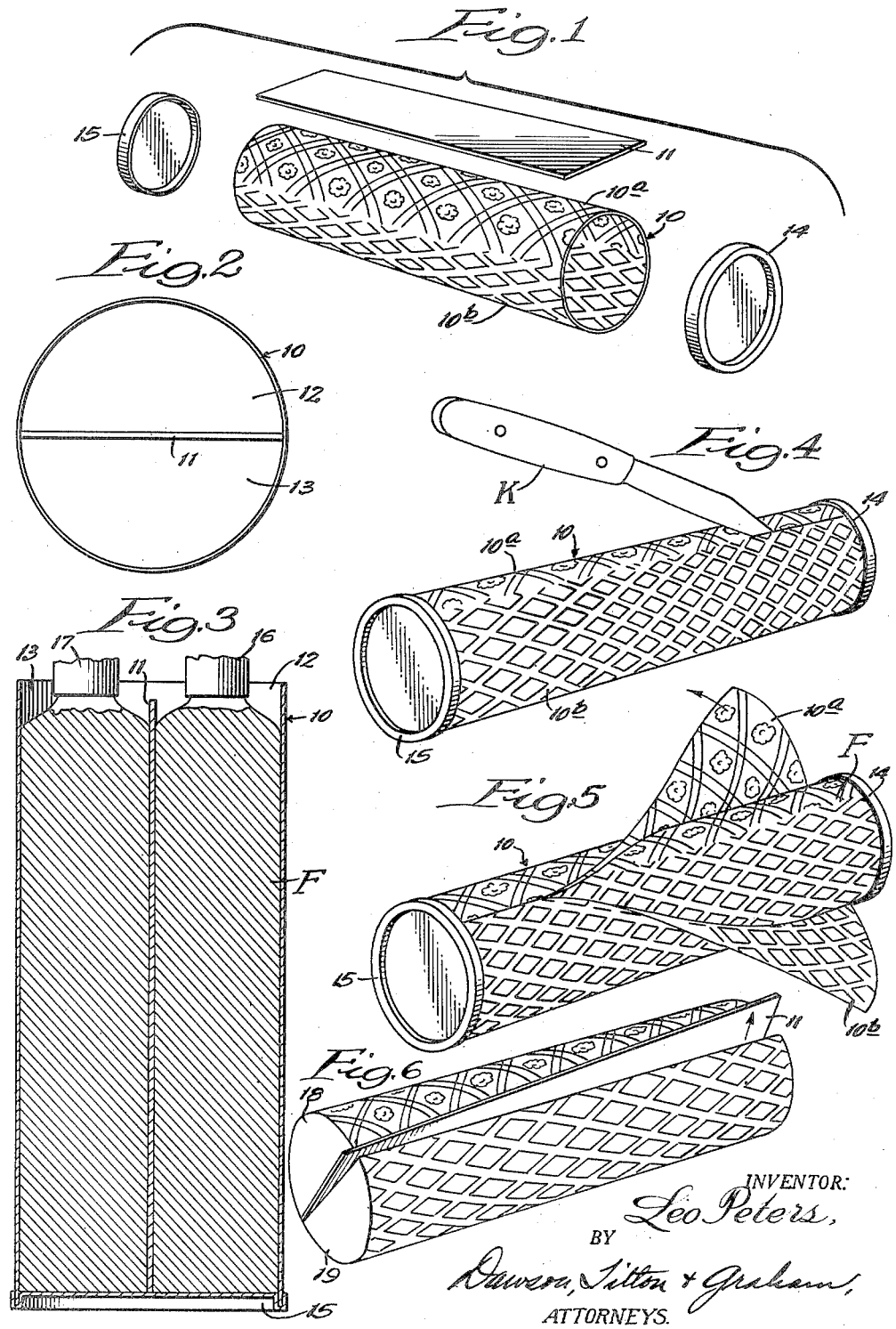
INVENTOR:
Leo Peters,
BY
Dawson, Tilton & Graham,
ATTORNEYS.

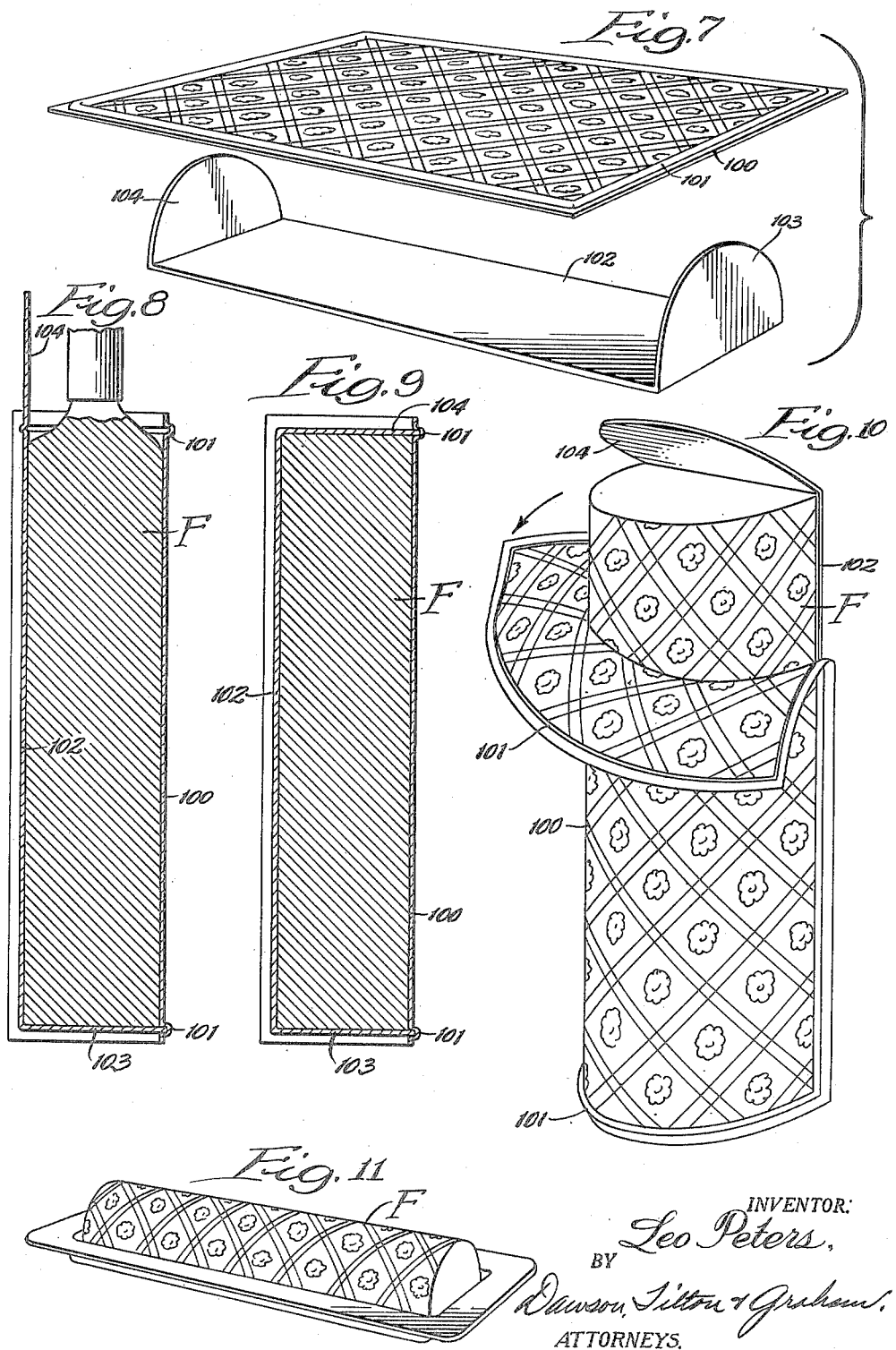

United States Patent Office 2,770,547
Patented Nov. 13, 1956

2,770,547

SOFT PLASTIC FOOD PACKAGE

Leo Peters, Grand Rapids, Mich.

Application August 16, 1954, Serial No. 450,188

7 Claims. (Cl. 99—171)

This invention relates to a package for molding foods into shapes having surface decorations, and then carrying and dispensing such foods with their shapes and surface decorations intact. More particularly, the invention applies to surface-decorated soft plastic foods packaged in, decorated by, and conforming to surface-decorated wrappers which, with their contents, constitutes complete packages in themselves without the need of any outside carton support or protection.

This invention achieves its maximum utility with soft plastic foods such as butter, margarine, ice-cream, cheese and cheese-foods, candies, gelatinous foods, meat spreads, and other foods of similar physical properties. The physical properties common to such foods include a body which is sufficiently firm to be shape retaining at temperatures of normal use, but sufficiently soft to be easily deformed under slight pressures. Common also is their flowability at temperatures above those of normal use, enabling them to be flow-filled into packages for molding into the shape and surface decorations of a package receptacle.

Heretofore, in the packaging of soft plastic foods, it has been generally accepted that the surfaces of such foods must conform, at least in greater part, to the surfaces of the container in which they are packaged. Thus, if a wrapper, of the thin non-self-supporting thicknesses normally employed for wrapping soft plastic foods, was used, then the wrapper also, of necessity, must be shape and surface conforming to both its contents and its outer carton. Further, it has been found with known packaging structures and materials that if the surface of the food and/or of the thin wrapper in which the food was carried did not conform to the surface of its outer carton or to other surfaces against which it was packed, then the surface of the food would inevitably become marred or misshapen as the package was subjected to the softening temperatures and/or shake-ups encountered in the channels of trade. It was deemed impossible for the surface-shape-preservation of such foods to produce them commercially with decorative and irregular surfaces supplied by a decorative wrapper and then carton them in or carry them against non-shape-conforming surfaces.

Previous packages for molding, carrying and dispensing decorative-surfaced soft plastic foods have been limited to package structures in which an inner surface-decorated wrapper was supported either wholly or in part by an outer carton or support. This has been deemed necessary because of the need for employing highly flexible and very thin wrappers; wrappers which because of their great flexibility and thinness could peel easily and freely from the molded foods. The flexibility of these wrappers was materially influenced by their thinness, which in turn increased the need for outer supporting structures. On the other hand, it would not heretofore have been thought practical to employ thick, self-supporting wrappers, since it would have been expected that the surface-decorated soft plastic food bodies could not be unwrapped or otherwise separated from such wrappers without marring their decorated surfaces. It would have been expected that such thick, self-supporting wrappers would have been too flexible and too thick at the point of peel to strip cleanly and freely from molded foods.

It is therefore a general object of this invention to provide a package for surface-decorated foods of novel construction and design which substantially overcomes the problems and limitations discussed above. More specifically, it is an object of this invention to provide a container and package structure adapted for the molding, carrying and dispensing of surface-decorated, soft plastic foods without requiring the use of any backing or support for the decorated walls of the container, while at the same time permitting the food body to be dispensed without marring its decorated surfaces. Further objects and advantages will appear as the specification proceeds.

This invention is shown in illustrative embodiments in the accompanying drawing, in which—

Fig. 1 is a perspective view of the elements of a container structure for use in practicing the present invention, showing the elements in separated relation; Fig. 2, a top view of the assembled container prior to the introduction of the soft plastic food; Fig. 3, a vertical sectional view of the container as it would appear while being filled with the soft plastic food; Fig. 4, a perspective view of the completed soft plastic food package illustrating one method of opening the package; Fig. 5, a perspective view similar to Fig. 4, showing a further step in the opening of the package; Fig. 6, a perspective view of the soft plastic food body after removal from the package as it is being separated into two portions; Fig. 7, a perspective view of the elements of a modified container structure for practicing the present invention; Fig. 8, a vertical sectional view showing the modified container in assembled condition as it is being filled with the soft plastic food; Fig. 9, a vertical sectional view of the completed package employing the modified container structure; Fig. 10, a perspective view of the completed container of Fig. 9 as it is being opened to dispense the soft plastic food body; and Fig. 11, a perspective view showing the food body of Fig. 10 on a conventional butter dish after being dispensed.

This invention is based in part on the discovery that surface-decorated plastic sheets can be separated from the conforming surfaces of soft plastic food bodies by a rolling-peeling action without marring the decorated surfaces of the food bodies, even though the plastic sheets are thick enough and resilient enough to be substantially self-supporting and shape-maintaining when formed into soft plastic food packages. No other packaging material appears to be capable of exhibiting this combination of properties, and prior to the present invention it was not suspected that plastic sheets could be made to do so. The surprising nature of this discovery will be brought out more fully in the following detailed description of the invention and various embodiments thereof.

Looking first at the embodiment of Figs. 1 to 6, the soft plastic food package there shown comprises a tubular container 10 having walls formed of an unbacked and unsupported plastic sheet. In this embodiment, the tubular container is of circular cross section, and has semi-cylindrical portions 10a and 10b which are provided with different indented decorative designs.

The characteristics of the plastic sheet forming tube 10 have been found to be of critical importance for the purposes of the present invention, and it is therefore desired to describe the essential characteristics thereof in considerable detail. First of all, the plastic sheet should have a thickness of from .008 to .03 inch. By employing plastic sheets having thicknesses within this range, it is possible to form tubular containers of various cross-sectional shapes whose decorated walls alone adequately protect the soft plastic food bodies while at the same time permitting the food bodies to be dispensed without marring their ornamented surfaces. Plastic sheet thicknesses ranging from .01 to .02 inch have been found to give particularly good results.

Another important characteristic of the plastic sheets employed for the purposes of this invention is that they should be sufficiently resilient so that when formed into containers having unbacked plastic sheet walls, the plastic sheet walls will be resiliently shape-restoring when deformed in local areas. For example, in accordance with this invention, when the plastic food within a container is in softened or liquified condition and a local area of a plastic sheet wall thereof is pressed inwardly with a finger or other object, upon removal of the finger or object the local area thus deformed will automatically return to its original shape due to its own resilience.

Still another characteristic of the plastic sheets which are suitable for practicing my invention is that they should be bendable through an arc of 180° without forming a crease or wrinkle at or adjacent said arc. The term "crease" is used herein in its ordinary meaning of a visible fold line or wrinkle which will remain in the sheet after it is unfolded. When this characteristic is met it is possible to separate the plastic sheets from the correspondingly decorated food body surfaces without marring these surfaces, even though the sheets also have the thickness and resilient characteristics defined above.

In the embodiment of Figs. 1 to 6, the container also includes a separator or divider 11 which is dimensioned for insertion into tube 10, as illustrated in Figs. 2 and 3, so as to divide the space within tube 10 into two semicircular compartments 12 and 13, thus providing curved surface-decorated walls in each compartment subtended by a flat non-decorated wall. Further, end caps 14 and 15 are provided for closing and sealing the ends of tube 10. In the illustration given, caps 14 and 15 are adapted to provide a friction seal with tube 10, but a heat seal can be employed if desired.

Turning to the embodiment of Figs. 7 to 10, the container there shown also employs a tubular container having walls formed of an unbacked plastic sheet of the thickness and characteristics heretofore defined, the plastic sheet being identified by the number 100. It will be noted that sheet 100 has an indented design impressed thereon, and a groove 101 extending around the periphery of the under side thereof, which is seen as a ridge on its upper or outer side. The other element of the modified container is a flat strip 102 which, in the illustration given, is provided with upturned ends 103 and 104. Sheet 100 and strip 102 are assembled in the manner illustrated in Figs. 8 and 9 to form a soft plastic food package which is semi-circular in cross section, plastic sheet 100 providing the curved semi-cylindrical walls while strip 102 provides the flat bottom or rear wall and the end closures. Preferably, sheet 100 is releasably heat sealed within groove 101 to the edges of strip 102 and its upturned ends 103 and 104.

Various kinds of plastic or thermoplastic materials can be used to form the plastic walls of the containers, providing the characteristics defined above are met. Among the thermoplastic materials which can be used are plasticized vinyl chloride, polyethylene, rubber hydrochloride, and similar thermoplastic materials in gauges of from .008 to .03 inch. These films can be made in various modifications to exhibit the necessary degree of resilience together with the necessary degree of flexibility. As stated above, the plastic sheet walls must be resiliently shape-restoring when deformed in local areas while being bendable through an arc of 180° without forming a crease. The other elements of the containers illustrated can also be formed from plastic or thermoplastic material, but are preferably formed from cardboard which has been waxed or treated to make it substantially impermeable to liquids, especially oily liquids like soft plastic foods in melted condition. Specifically, divider 11, end caps 14 and 15, and strip 102 can be formed of waxed cardboard.

Operation

The practice of the present invention can be illustrated by reference to the embodiment of Figs. 1 to 6. After the divider 11 is inserted in the container 10 to form the two compartments 12 and 13, and the lower cap 15 is applied, the container can be filled with the soft plastic food as illustrated in Fig. 3. Fig. 3 shows a soft plastic food F, such as butter or margarine, being simultaneously flowed into compartments 12 and 13 from nozzles 16 and 17. Cap 15 forms a liquid-tight seal with the lower end portion of tube 10 to prevent the soft plastic food from escaping while in liquid condition. After compartments 12 and 13 are substantially filled with the soft plastic food, it is allowed to set up or harden so that the solid food bodies are formed within the compartments having surfaces conforming closely to the walls of tube 10 and bearing the impressions of the indented designs of the walls. To complete the package, the top cap 14 is applied, which also forms a liquid-tight seal with the container 10.

The completed package, as shown in Fig. 4, can be opened by slitting the walls of tube 10 with a sharp-edged instrument such as knife K. Preferably, with this embodiment, the cut is made longitudinally following one edge of divider 11, with the tip of the knife against the edge of the divider to guide the cut. This prevents marring of the food body along its decorated surfaces. The walls of container 10 are then rolled back with a rolling-peeling action, as illustrated in Fig. 5, to expose the food body F. As a further step, the food body F is separated into two semi-cylindrical cakes 18 and 19 having differently ornamented surfaces, as illustrated in Fig. 6, by removing divider 11. The flat non-ornamented sides of the cakes 18 and 19 which were in contact with divider 11 provide bases for supporting the cakes on serving or storage dishes.

The embodiment of Figs. 7 to 10 is operated similarly to that of Figs. 1 to 6. Fig. 8 shows the flow-filling of the soft plastic food F into the open-topped container, and Fig. 10 illustrates the dispensing operation. With this embodiment, however, it is not necessary to cut the plastic sheet walls to release the food body. More specifically, the heat seal between the edges of strip 102 and sheet 100 is broken and sheet 100 is rolled back and separated from the food body by a rolling-peeling action. This step is illustrated in Fig. 10, and Fig. 11 shows the dispensed food body with its non-ornamented side resting on a conventional butter dish.

While in the foregoing specification this invention has been described in relation to two specific embodiments thereof and many details have been set forth for purpose of illustration, it will be apparent to those skilled in the art that the invention is susceptible to other embodiments and that many of the details set forth can be varied widely without departing from the basic concepts of the invention.

I claim:

1. A soft plastic food package, comprising an open-ended tubular container having walls formed of an unbacked sheet of thermoplastic material having a thickness of from .008 to .03 inch and being provided with an indented decorative design, said thermoplastic sheet walls being unsupported externally, a soft plastic food body within said container having outer surfaces conforming to said thermoplastic sheet walls and bearing the impression of said decorative design, and closures for the ends of said container, said thermoplastic sheet walls being resiliently shape-restoring when deformed in local areas while being bendable through an arc of 180° without forming a crease at said arc.

2. A soft plastic food package, comprising an elongated open-ended tubular container having externally-unsupported walls formed of a plastic sheet of .008 to .03 inch thickness and provided with an indented decorative design, removable end closures sealing the ends of said container, and a soft plastic food body within said container having outer surfaces conforming to said plastic sheet walls and bearing the impression of said decorative design, said plastic sheet walls being resiliently shape-restoring when deformed in local areas while being bendable through an arc of 180° without forming a crease at said arc.

3. A soft plastic food package, comprising an elongated open-ended tubular container having externally-unsupported walls formed of an unbacked sheet of thermoplastic material, said thermoplastic sheet walls having a thickness of from .008 to .03 inch and being provided with an indented decorative design, removable end closures sealing the ends of said container, and a soft plastic food within said container having outer surfaces conforming to said walls and bearing the impression of said decorative design, said walls being resiliently shape-restoring when deformed in local areas while being bendable through an arc of 180° without forming a crease at said arc.

4. A soft plastic food package, comprising a tubular container of circular cross section, a longitudinally-extending divider within said tube separating it into two compartments of semi-circular cross section, removable end closures sealing the ends of said compartments, the semi-circular walls of each of said compartments being formed of an externally-unsupported thermoplastic sheet of .008 to .03 inch thickness and having indented decorative designs impressed therein, a soft plastic food body within each of said compartments having outer surfaces conforming to the plastic sheet walls thereof and bearing the impression of said decorative designs, said plastic sheet walls being resiliently shape-restoring when deformed in local areas while being bendable through an arc of at least 180° without forming a crease at said arc.

5. A soft plastic food package, comprising a tubular container of circular cross section, a longitudinally-extending divider within said tube separating it into two compartments of semi-circular cross section, closures for the ends of said compartments, the semi-circular walls of each of said compartments being formed of an unbacked and externally-unsupported sheet of thermoplastic material, said thermoplastic sheet walls having a thickness of from .008 to .03 inch and having decorative designs impressed therein, a soft plastic food body within each of said compartments having outer surfaces conforming to the plastic sheet walls thereof and bearing the impression of said decorative designs, said plastic sheet walls being resiliently shape-restoring when deformed in local areas while being bendable through an arc of at least 180° without forming a crease at said arc.

6. A soft plastic food package, comprising a tubular container of semi-circular cross section having curved, externally-unsupported walls formed of a plastic sheet of .008 to .03 inch thickness and provided with an indented decorative design, and a soft plastic food body within said container having its outer surfaces conforming to said curved walls and bearing the impression of said decorative design, and closures for the ends of said container, said curved walls being resiliently shape-restoring when deformed in local areas while being bendable through an arc of 180° without forming a crease at said arc.

7. A soft plastic food package, comprising a tubular container of semi-circular cross section having curved, externally-unsupported walls formed of an unbacked sheet of thermoplastic material, said thermoplastic sheet walls having a thickness of from .008 to .03 inch and being provided with an indented decorative design, and a soft plastic food body within said container having its outer surfaces conforming to said curved walls and bearing the impression of said decorative design, and closures for the ends of said container, said curved walls being resiliently shape-restoring when deformed in local areas while being bendable through an arc of 180° without forming a crease at said arc.

References Cited in the file of this patent

UNITED STATES PATENTS

| | | |
|---|---|---|
| 1,526,782 | Fleischer | Feb. 17, 1925 |
| 2,051,923 | Vogt | Aug. 25, 1936 |
| 2,062,249 | Clearwater | Nov 24, 1936 |
| 2,545,243 | Rumsey | Mar. 13, 1951 |
| 2,604,244 | Tripp | July 22, 1952 |
| 2,631,939 | Peters | Mar. 17, 1953 |
| 2,633,986 | Vogt | Apr. 7, 1953 |
| 2,657,998 | Peters | Nov. 3, 1953 |